T. SHAW.
DUPLEX BALANCING CIRCUITS.
APPLICATION FILED MAY 29, 1918.

1,288,709.

Patented Dec. 24, 1918.
6 SHEETS—SHEET 1.

INVENTOR.
T. Shaw
BY G. E. Folk,
ATTORNEY.

T. SHAW.
DUPLEX BALANCING CIRCUITS.
APPLICATION FILED MAY 29, 1918.

1,288,709.

Patented Dec. 24, 1918.
6 SHEETS—SHEET 2.

INVENTOR.
T. Shaw
BY G. E. Folk,
ATTORNEY.

T. SHAW.
DUPLEX BALANCING CIRCUITS.
APPLICATION FILED MAY 29, 1918.

1,288,709.

Patented Dec. 24, 1918.
6 SHEETS—SHEET 3.

INVENTOR.
T. Shaw
BY G. E. Folk,
ATTORNEY

T. SHAW.
DUPLEX BALANCING CIRCUITS.
APPLICATION FILED MAY 29, 1918.

1,288,709.

Patented Dec. 24, 1918.
6 SHEETS—SHEET 4.

INVENTOR.
T. Shaw
BY G. E. Folk,
ATTORNEY.

T. SHAW.
DUPLEX BALANCING CIRCUITS.
APPLICATION FILED MAY 29, 1918.

1,288,709.

Patented Dec. 24, 1918.
6 SHEETS—SHEET 5.

INVENTOR.
*T. Shaw*
BY *G. E. Folk,*
ATTORNEY

T. SHAW.
DUPLEX BALANCING CIRCUITS.
APPLICATION FILED MAY 29, 1918.

1,288,709.

Patented Dec. 24, 1918.
6 SHEETS—SHEET 6.

INVENTOR.
T. Shaw
BY G. E. Folk,
ATTORNEY.

UNITED STATES PATENT OFFICE.

THOMAS SHAW, OF HACKENSACK, NEW JERSEY, ASSIGNOR TO AMERICAN TELEPHONE AND TELEGRAPH COMPANY, A CORPORATION OF NEW YORK.

DUPLEX BALANCING-CIRCUITS.

1,288,709. Specification of Letters Patent. Patented Dec. 24, 1918.

Application filed May 29, 1918. Serial No. 237,330.

*To all whom it may concern:*

Be it known that I, THOMAS SHAW, residing at Hackensack, in the county of Bergen and State of New Jersey, have invented certain Improvements in Duplex Balancing-Circuits, of which the following is a specification.

This invention relates to transmission circuits and more particularly to transmission circuits in which repeaters are employed for the purpose of amplifying telephonic or other signaling currents transmitted over said circuits.

The present method of operating telephone circuits on a two-way repeater basis, requires an individual basic net-work to balance each separate telephone circuit, and other associated balancing equipment to compensate for the impedance modifying effects of the various types of terminal equipment associated with the telephone line. "Building-out" circuits for the basic networks may also be required.

The balancing apparatus for a side circuit of a phantom ordinarily includes a phantom repeating coil, to compensate for the impedance effects of the phantom terminating coil, and balancing networks to compensate for the impedance effects of the standard composite telegraph set, when the telephone line is composited for Morse service. The balancing circuit for a phantom circuit ordinarily includes a repeating coil to compensate for the repeating coil which is used in the phantom line circuit to bring its impedance to approximately the same value as the side circuit impedance, and a "balancing" composite set, if the sides are composited for Morse operation. If the phantom and its sides are equipped with composite ringers, extra balancing apparatus may also be required in the line balancing network circuits on the "drop" side of the repeating coils.

The operating practice just described requires three separate and distinct groups of basic networks and associated balancing apparatus when a phantom group of circuits is operated on a two-way repeater basis,—one complete set for each side circuit and one complete set for the phantom itself. Within certain limitations it is possible to duplex the basic networks and their building-out sections, and also certain of the composite set balancing circuits, in a way electrically equivalent to that by which the telephone lines themselves may be duplexed. In other words, it is possible to obtain a more or less complex basic network unit which will simultaneously simulate the impedances of the three telephone circuits of a phantom line group.

It is one of the objects of this invention to provide instrumentalities whereby the possibilities above mentioned may be realized. Other and further objects of the invention will be clear from the following description when read in connection with the accompanying drawings in which—

Figure 1:
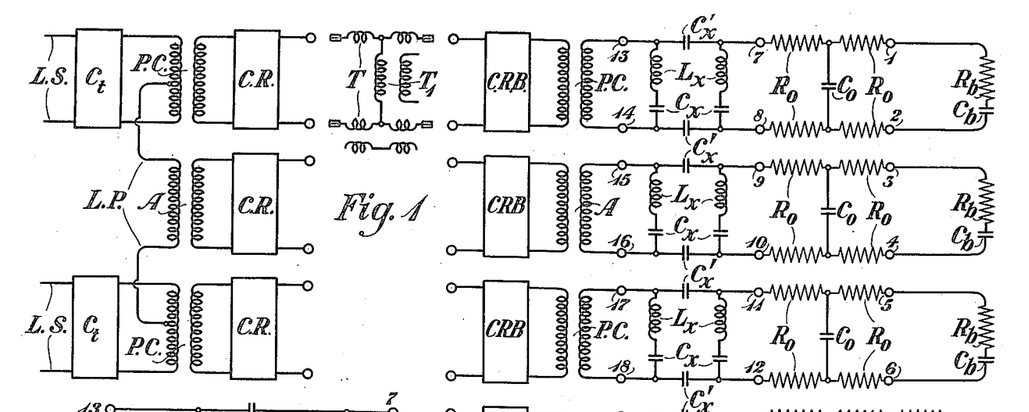
Figure 1 is a diagram, schematic in part, showing how side and phantom circuits may be balanced by employing separate balancing units.

Referring to Fig. 1, a pair of lines LS, LS are shown terminating at a repeater station in the usual phantom repeating coils PC, PC. The side circuits LS, LS are each provided with terminal composite apparatus schematically indicated at $C_t$ whereby each line conductor may be used for telegraph purposes. In order that a third or phantom circuit may be obtained from the conductors comprising the side circuits LS, LS, conductors LP are connected to the mid-points of the line windings of the phantom coils PC and terminate in a transformer A to step up the phantom impedance to the same value as the side circuit impedance. Composite ringing sets may also be provided on the "drop" sides of the coils PC and A as indicated schematically at CR. The composite apparatus $C_t$ and composite ringer CR are well known and in order to simplify the diagram are not shown in detail.

Any of the lines above described may be connected to other lines of the system through a two-way two-repeater system and when so connected all of the elements related to the line must be balanced with respect to the repeater by corresponding balancing apparatus. The balancing apparatus is shown at the right in Fig. 1. Thus, assuming the side circuits to consist of non-loaded open wire line connected to the repeater station through a section of non-loaded cable, the open wire lines will be balanced by networks of the type disclosed in Hoyt Patent 1,167,694 of January 11, 1916, said networks being connected across terminals 1—2 and 5—6, and each comprising a resistance $R_b$ in series with a capacity $C_b$. In order to simulate the sections of non-loaded cable, building-out sections extend between terminals 1—2 and 7—8 and between terminals 5—6 and 11—12. Each building-out section comprises series resistances $R_o$ and a shunt capacity $C_o$ connected as shown.

In order to balance the composite apparatus, networks are connected between terminals 7—8 and 13—14 as well as between terminals 11—12 and 17—18. Each of these networks consists of a pair of shunt connections including inductances $L_x$ and capacities $C_x$, the shunt connections being separated by series condensers $C'_x$. To balance the phantom coils of the lines, phantom coils PC, PC are connected to terminals 13—14 and 17—18 and composite ringer balancing sets C R B, C R B of a well known type may be inserted on the "drop" sides of the phantom coils to balance the composite ringers of the lines.

In a similar manner the elements of the phantom circuit LP are balanced by an artificial line connected across the terminals 3—4, a building-out section connected between terminals 3—4 and 9—10, a composite balancing set connected between terminals 9—10 and 15—16 and transformer A connected to terminals 15—16, with a composite ringer balancing set C R B connected to the "drop" side of the transformer. The artificial lines connected across terminals 1—2, 3—4 and 5—6 may be proportioned in accordance with the method described in the above mentioned Hoyt patent to simulate the characteristics of the side and phantom circuits. In order to show the relation of the balancing apparatus to the line apparatus a portion of the repeater set comprising the three winding output transformer T and the input bridge transformer $T_1$ is illustrated in connection with line LS.

The above described arrangement of balancing apparatus is typical of one of the more complicated general cases which may arise, but cases may occur in which the lines do not terminate in non-loaded cable. In such cases the building-out sections of the balancing apparatus will be omitted. In other instances the lines may not be composited or phantomed, in which instances the composite balancing sets or the phantom coils, as the case may be, will be omitted. In general any possible combination including some or all of the above elements may be used depending on the character of the circuit to be balanced.

Figure 2:
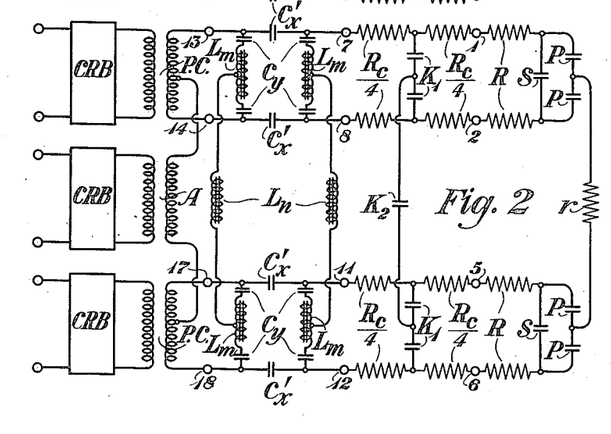
Fig. 2 is a diagram showing how such circuits may be balanced by means of a duplex balancing circuit.

Fig. 2 shows how certain of the above balancing elements may be duplexed in a simple manner. Where the balancing apparatus is to be duplexed the phantom connections will of course be the same on the artificial line side as on the line side of the repeater. In order to duplex the composite balancing set, each of the shunt inductances $L_x$ and shunt capacities $C_x$ of the composite balancing set of the side circuit, may be replaced in Fig. 2 by an inductance $L_m$ and two capacities $C_y$. The series capacities $C'_x$ will remain as before. By connecting the neutral points of the inductances $L_m$ in corresponding shunts across the two side circuits as shown, and including inductances $L_n$ in such phantom connections, the inductances $L_m$ will be ineffective in the phantom, so that the inductances $L_n$ and capacities $C_y$ will serve as the shunt inductance and capacity for the phantom circuit.

Similar the building-out sections may be duplexed by replacing the shunt capacities $C_o$ of the side circuit of Fig. 1 by two shunt condensers $K_1$, $K_1$ in the side circuits of Fig. 2 and by connecting the junction points of capacities $K_1$ in the shunts of the two side circuits by conductors including capacities $K_2$. The series resistances $R_o$ may be replaced by series resistances $R_c/4$ of the same value.

In order to duplex the artificial lines the resistances $R_b$ of the side circuit may each be replaced by two resistances R and each capacity $C_b$ may be replaced by a capacity S in parallel with two series capacities P, P as shown. The junction points of capacities P, P may be connected by a conductor including a phantom adjusting resistance $r$ to complete the connection for the phantom circuit.

Duplex composite balancing sets.

Returning now to the duplex composite balancing set it will be seen that the total series capacity in each side circuit is equal to $C'_x/2$ while the corresponding capacity for the phantom is $C'_x$. The total capacity in each shunt across the side circuit is $$\frac{C_y}{2}$$

while the corresponding capacity of the phantom shunt is $C_y$. The total inductance in each side circuit shunt is $L_m$ while the corresponding phantom inductance is $L_n$.

Figure 3:
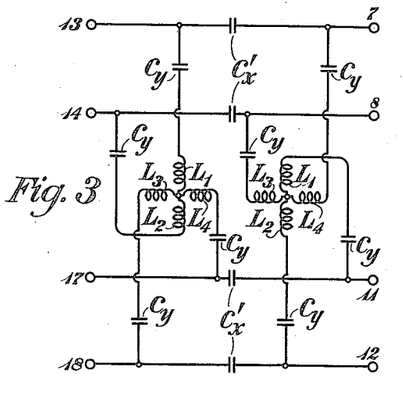
Figs. 3 and 4 are diagrams of two modified forms of duplex units for balancing the composite telegraph sets associated with the four conductors comprising a phantom and two side circuits.

Substantially the same result may be secured by substituting for the six inductance coils of Fig. 2 a pair of branch core inductance units of the type disclosed in patent to Espenschied No. 1,233,766 of July 17, 1917, the windings being connected as shown in Fig. 3. The four windings $L_1$, $L_2$, $L_3$ and $L_4$ of the branch core inductance are arranged upon the radiating arms of a core having four branches. If in such an inductance unit the self inductance of each winding be designated as L, the mutual inductances between windings $L_1$ and $L_2$ and between $L_3$ and $L_4$ be designated by M, and the mutual inductances between windings $L_1$ and $L_3$, between $L_2$ and $L_3$, between $L_1$ and $L_4$ and between $L_2$ and $L_4$ be designated by N, it may be shown that the inductance in each shunt of the side circuit is equal to 2(L+M) and the corresponding inductance of the phantom circuit is equal to L−M+2N. The same capacity relations hold for the circuit of Fig. 3 as for the corresponding circuit shown in Fig. 2.

Figure 4:
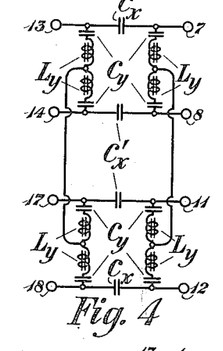

Still another modification is illustrated in Fig. 4 in which the capacity arrangement is the same as before but two inductance coils $L_y$ are utilized in each of the bridges of the side circuit, junction points of the coils in the two side circuits being connected through conductors as shown. It will be seen from this arrangement that the inductances $L_y$ are effective in both the side circuit and the phantom circuits. Consequently each bridge inductance of the side circuits is $2L_y$ and the corresponding bridge inductance of the phantom is $L_y$.

Duplex building-out sections.

Considering next the form of building-out section shown in Fig. 2 it will be apparent from the diagram that the total series resistance of each side circuit, so far as the building-out sections are concerned, is equal to $R_c$, and that the corresponding series resistance of the phantom is equal to $$\frac{R_c}{2}.$$

It will also be apparent that the capacity in shunt across each side circuit of the building-out section is equal to $$\frac{K_1}{2}$$

while the shunt capacity of the phantom is equal to $$\frac{K_1 K_2}{K_1 + K_2}.$$

Figure 5:
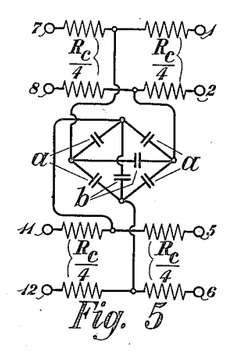
Figs. 5 and 6 are diagrams of modified forms of duplex "building-out" units.

The condenser unit making up this capacity in Fig. 2 is a five condenser unit which is capable of use in various relations as hereinafter pointed out. This condenser unit may be replaced by a six condenser unit connected in a manner similar to a Wheatstone bridge as shown in Fig. 5. It will be seen from the diagram that the capacity shunted across the side circuit is equal to $a+b$ while for the phantom circuit the capacities designated $b$ are eliminated as they are connected to neutral points of the bridge and the capacity in bridge of the phantom circuit is therefore equal to $4a$.

Figure 6:
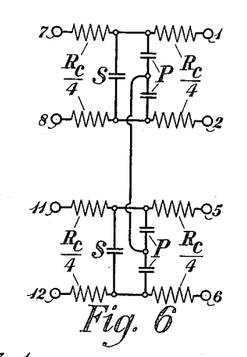

A still further form of six condenser unit may be employed as shown in Fig. 6. In accordance with this arrangement a condenser S is bridged across each side circuit, while in parallel therewith are bridges including a pair of condensers P, P in series, the midpoints of the latter bridges being connected by a phantom conductor. It will be seen that the shunt capacity of each side of the building-out section is equal to $$S + \frac{P}{2}$$

while for the phantom circuit the shunt capacity is equal to P.

Duplex artificial lines for non-loaded duplex lines.

Returning finally to the duplexed artificial line of Fig. 2 it will be seen that in the side circuit between terminals 1 and 2 we have a total resistance 2R corresponding to the resistance $R_b$ of the basic network of Fig. 1, said resistance being in series with a capacity equal to $$S + \frac{P}{2}.$$

For the phantom circuit the resistance is equal to $R+r$ and the capacity equal to P, the capacities S being eliminated because of their connection to equi-potential points.

Figure 7:
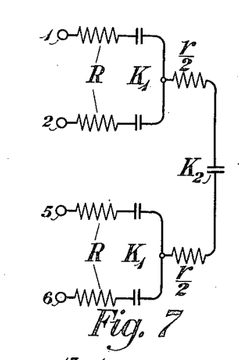
Figs. 7, 8, 9 and 10 are diagrams of modified duplex units for balancing duplex non-loaded open wire lines.

It will be noted that in the duplex artificial line of Fig. 2 a six condenser unit of the character shown in Fig. 6 is employed. A similar result may be secured by using a five condenser unit with one condenser in the phantom tap as illustrated in Fig. 7. In this case the resistance $r$ of Fig. 2 may be divided, one-half being placed on each side of the condenser $K_2$ for purposes of symmetry. The side circuit resistance in this case will be 2R and the phantom resistance R+$r$ as before. The side circuit capacity will however be equal to $$\frac{K_1}{2}$$

and the phantom capacity will be equal to $$\frac{K_1 K_2}{K_1 + K_2}.$$

Figure 8:
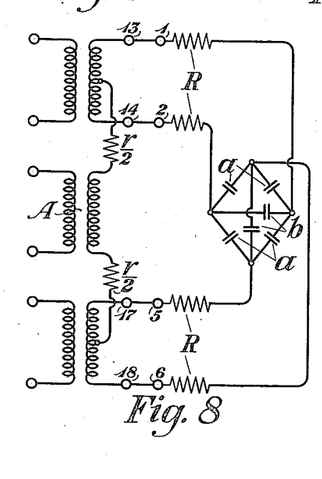

Instead of the arrangement shown in Fig. 7 a six condenser unit of the balanced bridge type may be employed as shown in Fig. 8. In this case it is convenient to insert the phantom adjusting resistances $$\frac{r}{2}$$

in the phantom taps leading to the transformer A. The resistance relations will in this case be the same as in Fig. 7. The capacity of the side circuit will be equal to $a+b$ while the capacity of the phantom will be $4a$.

Figure 9:
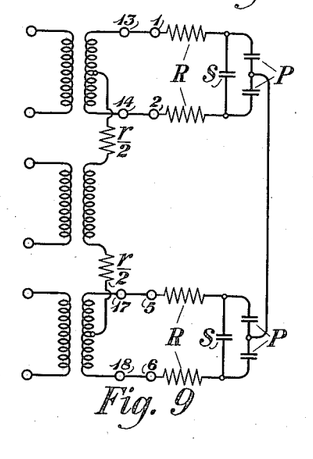

The arrangement shown in Fig. 8 may be modified by substituting for the balanced bridge condenser unit a six condenser unit of the type shown in Fig. 6. This modification is shown in Fig. 9 and it will be readily apparent that the resistance relations are the same as in Fig. 7. The side circuit capacity will in this case be equal to $$S + \frac{P}{2}$$

and the phantom capacity will be equal to P.

Figure 10:
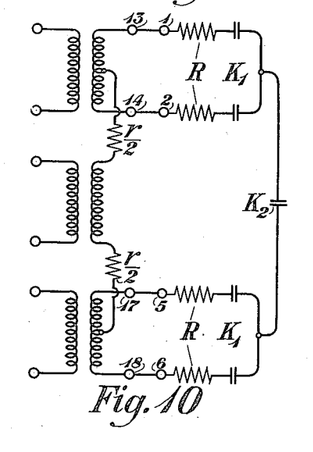

Still another modification is shown in Fig. 10 in which a five condenser unit of the type illustrated in Fig. 7 is employed in combination with the resistance arrangement of Fig. 8. In this case also the resistance relations will be the same as before, while the side circuit capacity will be equal to $$\frac{K_1}{2}$$

and the phantom capacity will be equal to $$\frac{K_1 K_2}{K_1 + K_2}.$$

Figure 11:
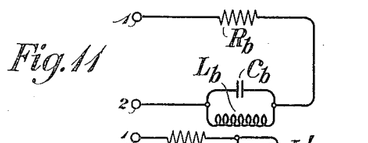
Fig. 11 is a diagram of a basic network for balancing a loaded line.
Figure 12:
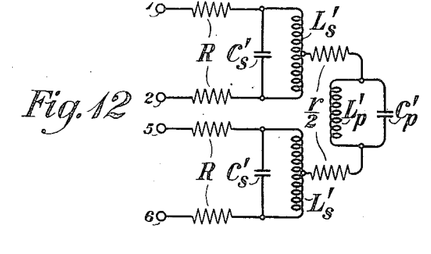
Figs. 12 to 21 inclusive, are diagrams of a number of forms of duplex networks for balancing loaded duplex lines.

*Duplex artificial lines for loaded duplex lines.*

Where a loaded line is to be balanced the basic network for the artificial line of Fig. 1 may be of the type shown in Fig. 11 consisting of a resistance $R_b$ in series with an anti-resonant combination consisting of a capacity $C_b$ in shunt with an inductance $L_b$. The elements of this network may be designed in accordance with patent to Hoyt 1,124,904 of January 12, 1915. A network of this type may be duplexed as shown in Fig. 12 by providing a resistance R in each conductor of the side circuit upon either side of an anti-resonant combination consisting of an inductance $L'_s$ in parallel with a capacity $C'_s$. A phantom connection may be made from neutral points of the inductance $L'_s$ of the two side circuits, said connection including phantom adjusting resistances $$\frac{r}{2}$$

between which is located an anti-resonant combination consisting of an inductance $L'_p$ in parallel with a capacity $C'_p$. As the inductance coils $L'_s$ are non-inductive with respect to current flowing in the phantom circuit, they merely add to the phantom their direct current resistance which may be so low as to be practically negligible. The side circuit capacities $C'_s$ are connected across equi-potential points in the phantom circuit and are therefore ineffective in the phantom circuit. Resistances R thus are the only elements simultaneously effective in both the phantom and side circuit of the network unit. It will therefore be apparent that the resistance of the side circuit is equal to 2R and the corresponding resistance of the phantom is R+$r$. The capacity of the side circuit is $C'_s$ while that of the phantom is $C'_p$. Also the inductances of the side and phantom circuits are $L'_s$ and $L'_p$ respectively.

Figure 13:
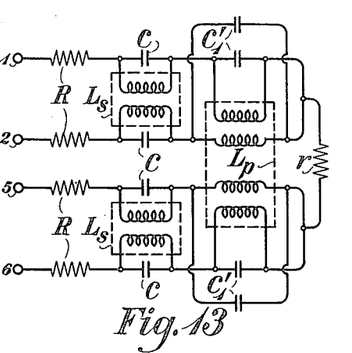

A modified form of duplex network for balancing duplex loaded lines is illustrated in Fig. 13. In this figure resistances R are inserted in each line wire of the unit and are effective in the phantom circuit and in the side circuits, the phantom adjusting resistance $r$ being included in a circuit which joins the neutral points of the side circuit of the unit. Each side circuit also includes a side circuit type inductance coil $L_s$ having each winding shunted by a condenser C, and a standard type phantom circuit inductance coil $L_p$ is employed with a line winding in each of the four-line wires of the unit, each of the windings being shunted by condenser $C'_1$. Each circuit of the unit thus has its own individual anti-resonant combination of a particular capacity in shunt with a particular inductance.

The side circuit anti-resonant combination is without effect in the phantom circuit, and the phantom circuit anti-resonant combination is ineffective in the side circuits for the reason that the side circuit and phantom circuit inductance coils are non-inductive to the phantom circuit and side circuit current respectively. In consequence, the coils add merely their direct current resistance to the superposed circuits. This resistance is of such a low value as to act practically as a dead short circuit upon the associated condensers, the resultant electrical effect being that the side circuit anti-resonant shunts add nothing but a small resistance to the phantom circuit of the network unit, and correspondingly, the phantom circuit anti-resonant shunt adds merely a small resistance to the side circuits.

The two anti-resonant shunts in each side circuit are electrically equivalent to a single anti-resonant shunt having an inductance equal to $L_s$ and a capacity equal to $C/2$. In the phantom circuit there are four anti-resonant shunts in a parallel series grouping, and these are electrically equivalent to an anti-resonant shunt having an inductance $L_p$ and a capacity $C'_1$. The resistance relations are the same as in the case of Fig. 12.

Figure 14:
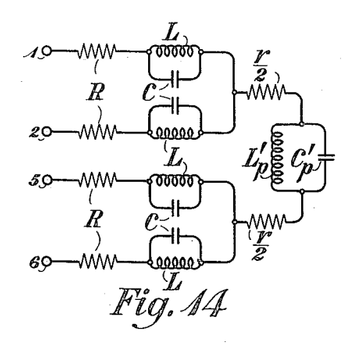

A still further modification is illustrated in Fig. 14. This modification differs from that of Fig. 12 in that instead of a single anti-resonant shunt in each side circuit, two anti-resonant shunts comprising inductances L in parallel with capacities C are employed in the side circuit, one in each conductor. A phantom connection similar to that of Fig. 12 is made to neutral points of the side circuit.

The resistance values for this circuit are the same as for Fig. 12. There are two anti-resonant shunts in series in the side circuit electrically equivalent to a single anti-resonant shunt having an inductance 2L and capacity $C/2$. In the four wire portion of the network there are four anti-resonant shunts effective in the phantom; these are electrically equivalent to a single anti-resonant shunt of inductance L and capacity C. This equivalent circuit when acting in series with the phantom adjusting anti-resonant shunt having inductance $L'_p$ and capacity $C'_p$, is then electrically equivalent to a single anti-resonant shunt having inductance $L+L'_p$, and capacity $$\frac{CC'_p}{C+C'_p}$$

providing, however, that the various inductance and capacity elements also have mutual relations expressed by the following equation:

$$L'_p C'_p = LC.$$

This equation is a mathematical way of stating that the parallel inductance and condenser combination should all be resonant at the same critical frequency.

Figure 15:
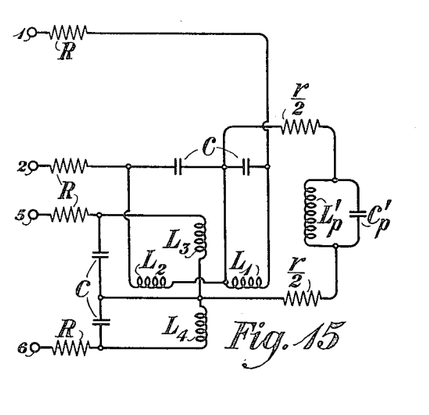

Instead of four separate inductance coils L being employed in the two side circuits a branch core type of inductance coil such as described in connection with Fig. 3 may be employed. This arrangement is shown in Fig. 15. Each of the windings $L_1$, $L_2$, $L_3$ and $L_4$ of the branch core inductance is shunted by a capacity C. A phantom connection similar to that of Fig. 14 is made to neutral points of the side circuits, i. e., to the junction points of windings $L_1$, $L_2$ and $L_3$, $L_4$.

The resistance relations are the same as in Fig. 12. Designating the self inductance of each winding of the branch core inductance as L and the mutual inductances as M and N in accordance with the convention adopted in connection with Fig. 3 it is apparent that the effect upon the side circuit of the branch core inductance and its associated condensers is electrically equivalent to an anti-resonant shunt of capacity $C/2$ and inductance $2(L+M)$. With regard to the phantom it is equivalent to an anti-resonant shunt of capacity C and inductance $L-M+2N$. This equivalent anti-resonant shunt in series with the phantom adjusting shunt of capacity $C'_p$ and inductance $L'_p$ is equivalent to an anti-resonant shunt of inductance $L-M+2N+L'_p$ and capacity $$\frac{CC'_p}{C+C'_p}.$$

This relation of course is subject to the requirement that the several anti-resonant shunts shall be resonant at the same critical frequency.

Figure 16:
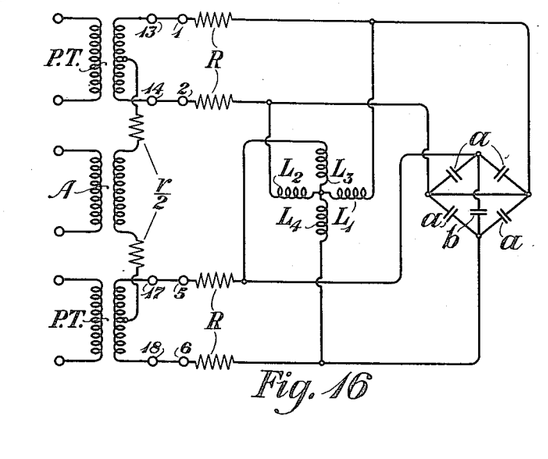

A still further modification is illustrated in Fig. 16. In this figure the anti-resonant shunt for both the side and phantom circuit is secured by means of a branch core inductance of the type described in connection with Fig. 3, said inductance being shunted by a six condenser unit of the balanced bridge type. With this arrangement the phantom adjusting resistance $$\frac{r}{2}$$

may be inserted in the taps leading from the phantom coils PT, PT to the transformer A. The resistance relations will be the same as in Fig. 12. The parallel inductance and capacity units employed will be electrically equivalent, as regards the side circuit, to an anti-resonant shunt of inductance $2(L+M)$ and capacity $a+b$. With regard to the phantom circuit the equivalent anti-resonant shunt would have an inductance equal to $L-M+2N$ and a capacity equal to $4a$.

Figure 17:
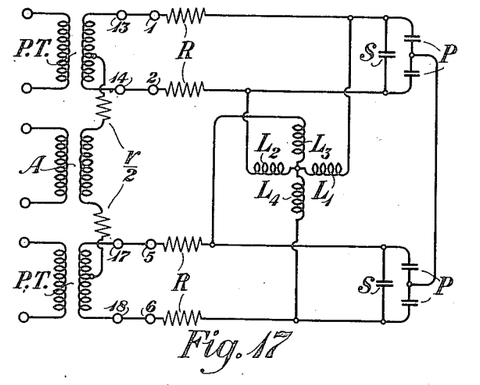

Instead of using a six condenser unit of the balanced bridge type, a six condenser unit of the type shown in Fig. 6 may be substituted as shown in Fig. 17. The phantom adjusting resistances $$\frac{r}{2}$$

are shown connected to the taps leading from the phantom coils PT, PT but it is obvious that they may be combined as a single resistance $r$ and inserted in the phantom conductor of the condenser unit. The resistance and inductance relations of this arrangement are the same as in Fig. 16. For the side circuit the capacity of the equivalent anti-resonant shunt is equal to $$S + \frac{P}{2}$$

and for the phantom circuit it is equal to P.

Figure 18:
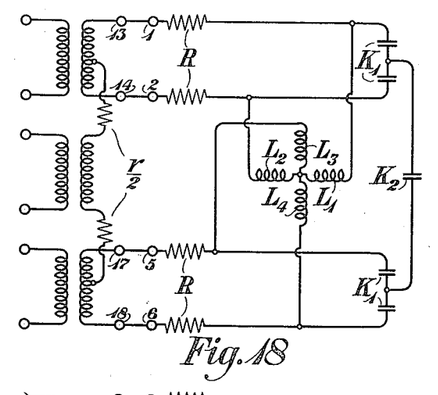

Fig. 18 shows how a five condenser unit may be arranged in shunt of the branch core inductance. Here also the same resistance and inductance relations hold as in the case of Fig. 16, while the capacity of the equivalent anti-resonant shunt for the side circuit is equal to $$\frac{K_1}{2}.$$

The corresponding capacity for the phantom circuit is equal to $$\frac{K_1 K_2}{K_1 + K_2}.$$

Figure 19:
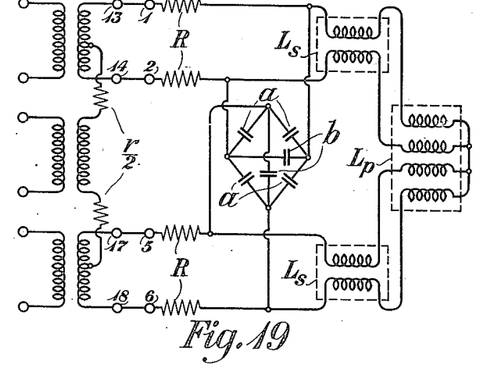

Instead of employing the branch core inductance arrangement of Fig. 16 the arrangement of Fig. 19 may be used. In accordance with this figure a side circuit type of inductance coil $L_s$ is included in each side circuit as shown, and a phantom circuit inductance coil $L_p$ with one winding in each of the four line wires of the unit is employed. The coils $L_s$ are so wound as to be without effect in the phantom and the coil $L_p$ is so wound as to be without effect in the side circuits. A six condenser unit of the balanced bridge type is then arranged in shunt across the sides and the phantom as shown. The resistances are arranged the same as in Fig. 16.

With this arrangement of elements it is clear that the inductance and capacity combination of the side circuit is equivalent to an anti-resonant shunt having an inductance equal to $L_s$ in parallel with a capacity equal to $a+b$. As regards the phantom it is equivalent to an anti-resonant shunt having an inductance $L_p$ in parallel with a capacity $4a$. The resistance relations will be the same as in the arrangement shown in Fig. 16.

Figure 20:
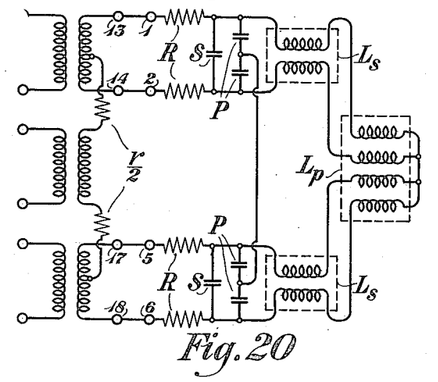

Instead of the balanced bridge type of condenser unit a six condenser unit of the type illustrated in Fig. 6 may be employed as shown in Fig. 20. In this case the capacity of the equivalent anti-resonant shunt of the side circuit will be $$S + \frac{P}{2}$$

and for the phantom the capacity will be equal to P.

Figures 21, 22, 23, 24, 25, 26:
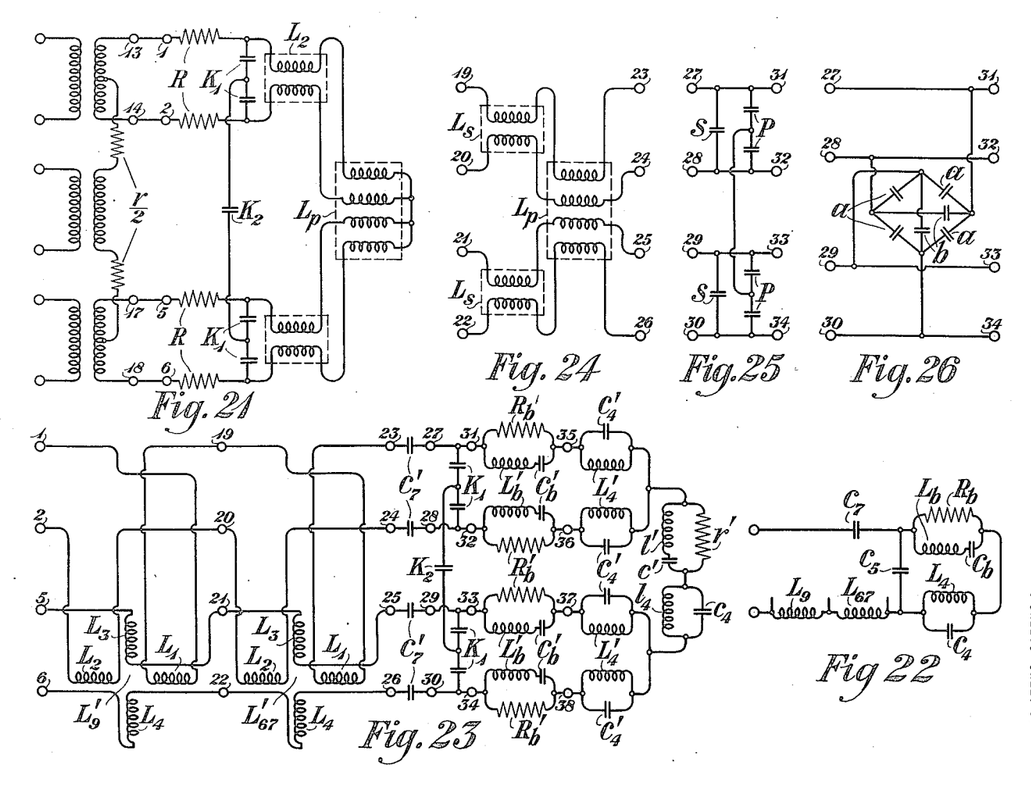
Fig. 22 is a diagram of a basic network for balancing loaded lines with greater precision than is possible with a network of the type shown in Fig. 12.
Fig. 23 is a diagram of a form of duplex "precision" network for loaded lines.
Figs. 24, 25, 26 and 27 are alternative arrangements for certain elements of the network illustrated in Fig. 23.

As shown in Fig. 21 the five condenser capacity unit may be employed in connection with the side circuit and phantom circuit inductance coils $L_s$ and $L_p$ to make up the anti-resonant combination. The capacity of the combination will in this case be $$\frac{K_1}{2}$$

for the side circuit and $$\frac{K_1 K_2}{K_1 + K_2}$$

for the phantom.

*Duplex precision network for duplex loaded lines.*

Where greater precision is desired in balancing the loaded line a basic network of the type disclosed in Fig. 22 may be employed as the artificial line. This network comprises a series anti-resonant shunt $C_4$, $L_4$ and an additional series combination consisting of resistance $R_b$ in parallel with a series resonant circuit including capacity $C_b$ and inductance $L_b$. In shunt with the two series combinations is a capacity $C_5$ and in series with said combination is a capacity $C_7$. The elements of this network may be proportioned in the manner outlined in Hoyt Patent 1,167,693 of January 11, 1916. In addition to the above elements it is customary to employ building-out units such as inductances $L_9$ and $L_{67}$.

An arrangement of this character may be duplexed as shown in Fig. 23. In this figure the inductance $L_9$ is replaced by branch core inductance unit $L'_9$ comprising coils $L_1$, $L_2$, $L_3$ and $L_4$ connected as shown, so that by designating the self inductance as $L'_9$ and the mutual inductances as $M'_9$ and $N'_9$ respectively, it will be apparent from analogy to Fig. 3 that the resultant inductance for the side circuit is 2 $(L'_9+M'_9)$ and for the phantom circuit is $L'_9-M'_9+N'_9$. In a similar manner the inductance $L_{67}$ of the basic unit is replaced by a branch core inductance $L'_{67}$. Either or both of these inductance units may be replaced by a combination of side circuit inductance coils $L_s$ and phantom circuit inductance coil $L_p$ as shown in Fig. 24 in which case the side circuit inductance will be equal to $L_s$ and the phantom inductance $L_p$.

The series condenser $C_7$ may be replaced in the network of Fig. 23 by a condenser $C'_7$ in each of the four wires of the unit. The shunt capacity $C_5$ may be replaced by a five condenser unit of the type illustrated in Fig. 10 so that the shunt capacity for the side circuit is $$\frac{K_1}{2}$$

and for the phantom is $$\frac{K_1 K_2}{K_1 + K_2}.$$

Instead of this type of condenser unit a six condenser unit of the type shown in Fig. 2, or a six condenser unit of the balanced bridge type illustrated in Fig. 26 may be substituted. In the former case which is illustrated in Fig. 25, the shunt capacity for the side circuit will be $$S + \frac{P}{2}$$

and for the phantom will be P. In the latter case it will be $a+b$ for the side circuit and $4a$ for the phantom.

The combination $R_b$, $L_b$, $C_b$ of the basic network may be replaced in Fig. 23 by a similar combination consisting of resistance $R'_b$, inductance $L'_b$ and capacity $C'_b$ in each conductor of each side circuit, together with a similar combination $l'$, $c'$, $r'$ for adjusting purposes in the phantom connection to neutral points of the side circuits. The series capacity and inductance of each of these elementary shunt circuits should be so proportioned as to be resonant at the same critical frequency as the series resonant combination $L_b$, $C_b$. The resistance corresponding to $R_b$ of the basic network will be $2R_b'$ for the side circuit and $R_b' + r'$ for the phantom.

The anti-resonant shunt $L_4$, $C_4$ of the basic network may be replaced in Fig. 23 in a similar manner by splitting it up into similar anti-resonant shunts $L_4'$, $C_4'$ in each wire of each side circuit and an anti-resonant shunt $l_4$, $c_4$ in the phantom connection. Each of these anti-resonant shunts should be resonant at the same critical frequency.

Figure 27:
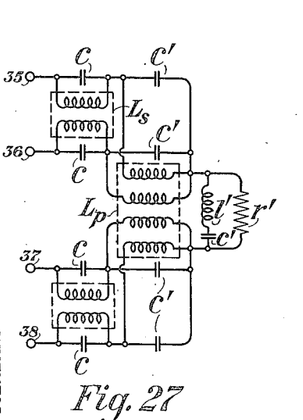

The arrangement shown in Fig. 23 at the right of terminals 35, 36, 37 and 38 may be replaced by the arrangement shown in Fig. 27 consisting of inductance coils $L_s$ in the side circuit and inductance coils $P_s$ in the phantom circuit, each winding of each of these coils being shunted by a capacity. The equivalence of these two arrangements will be clear from a comparison of Figs. 13 and 14 already discussed.

*Duplex network for non-loaded duplex cable.*

Figure 28:
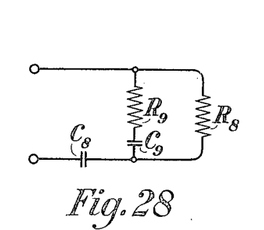
Fig. 28 is a diagram of a basic network suitable for balancing a line constructed of non-loaded cable.

When the duplex line is constructed of non-loaded cable the basic network for balancing each line of the system may be of the type illustrated in Fig. 28 and consists of a capacity $C_8$ in series with a resistance $R_8$, the latter element being shunted by a series combination of resistance $R_9$ and capacity $C_9$. These elements may be proportioned according to the method described in Hoyt Patent 1,240,213, September 18, 1917.

Figure 29:
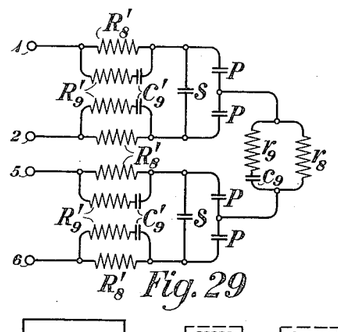
Figs. 29 and 30 are diagrams of duplex units suitable for balancing duplex non-loaded cable.

One manner of duplexing a network of this character is illustrated in Fig. 29. In this figure the combination $R_8$, $R_9$, $C_9$ is replaced by a similar combination $R'_8$, $R'_9$, $C'_9$ in each wire of each side circuit and a similar combination $r_8$, $r_9$, $c_9$ in the phantom conductors connected to neutral points of the side circuits. The series capacity $C_8$ may be replaced by a six condenser unit of the type shown in Fig. 25. With this arrangement of circuits the resistance of the side circuit corresponding to $R_8$ of the basic network is equal to $2R'_8$ and for the phantom is $R'_8 + r_8$. The resistance corresponding to $R_9$ is $2R'_9$ for the side and $R'_9 + r_9$ for the phantom. The capacity corresponding to $C_9$ is equal to $$\frac{C'_9}{2}$$

for the side circuit and $$\frac{C'_9 c_9}{C'_9 + c_9}$$

for the phantom. The capacity corresponding to $C_8$ is equal to $$S + \frac{P}{2}$$

for the side and P for the phantom.

Figure 30:
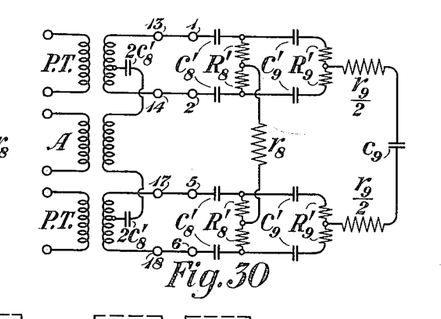

An alternative arrangement is disclosed in Fig. 30. In this figure the series capacity $C_8$ is replaced by a capacity $C'_8$ in each wire of each side circuit and phantom adjusting capacities $2c'_8$ in the phantom taps leading to the transformer A. The resistance $R_8$ is replaced by two resistances $R'_8$ serially bridged across the side circuit with a corresponding phantom adjusting resistance $r_8$ in a phantom connection between neutral junction points of resistances $R'_8$, $R'_8$. The series combination $R_9$, $C_9$ is replaced with respect to the side circuit by a shunt about the resistances $R'_8$ bridged across the side circuits, said shunt including capacities $C'_9$, $C'_9$ and resistances $R'_9$, $R'_9$. A phantom connection is made between the neutral junction points of resistances $R'_9$, $R'_9$ and phantom adjusting capacity $C_9$ and resistances $$\frac{r_9}{2}, \frac{r_9}{2}$$

included therein.

With this arrangement of the circuit the capacity corresponding to $C_8$ will be $$\frac{C'_8}{2}$$

for the side and $$\frac{C_8' c'_8}{C_8' + c'_8}$$

for the phantom. The resistance corresponding to $R_8$ will be $2R'_8$ for the side and $R'_s + r_s$ for the phantom. The resistance corresponding to $R_9$ will be $2R'_9$ for the side and $R_9' + r_9$ for the phantom, while the capacity corresponding to $C_9$ will be $$\frac{C'_9}{2}$$

for the side $$\frac{C'_9 c_9}{C'_9 + c_9}$$

for the phantom.

The foregoing comprise a large number of duplex network units capable of use in balancing duplex transmission lines and various apparatus associated therewith. It will be apparent that these units may be interchanged and arranged in various combinations as the requirements of each case may determine. Furthermore it will be apparent that other arrangements than those specified may be devised.

Figure 31:
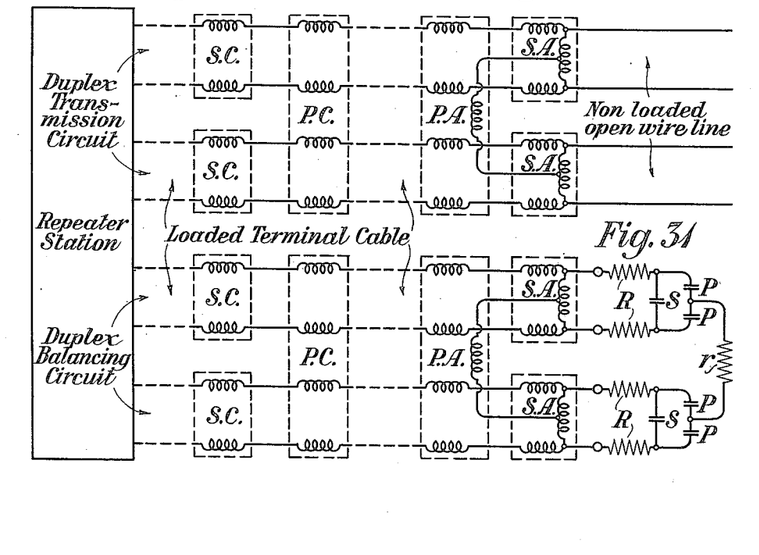
Fig. 31 is a diagram of a transmission system showing how a duplex balancing unit may be employed to great advantage.

The advantage to be derived from the use of duplex networks will be clear from a consideration of the situation where a duplex open wire line terminates at a repeater station through a loaded cable. In such an arrangement, in order to compensate for the impedance effects of the loaded terminal cable, there is a distinct advantage in including loaded cable circuits of corresponding electrical qualities in the balancing circuits. This object can be attained by installing the duplex network units at the outer end of a loaded terminal cable of the same character as the cable terminating the real line. This arrangement is indicated diagrammatically in Fig. 31. Such an arrangement requires a duplex auto-transformer arrangement comprising side circuit auto-transformers S A and phantom circuit auto-transformers P A between the open wire line and terminal cable to reduce reflection losses at the junction points. It is therefore desirable to use similar duplex auto-transformer arrangements in the balancing circuits as illustrated in the drawings. The side circuits and phantom circuits of the loaded cable in both the real and artificial line would of course include the usual side circuit loading coils S C and the phantom circuit loading coils P C. The loaded cable in the balancing circuit could be terminated by a duplex network suitable for balancing open wire lines, such for instance, as the network illustrated in Fig. 2.

If duplex line networks should not be available, it would be necessary to use inequality ratio repeating coils in the balancing network circuits, in order that the standard individual networks for the phantom and side circuits might be used. Consequently it would be necessary also to use repeating coils in the talking circuits at the junction of the open wire line and loaded cable. Repeating coils would be objectionable as compared with auto-transformers because of their relatively greater transmission losses. They also interfere with the direct current signaling or testing over the phantom line wires.

It will be obvious that the general principles herein disclosed may be embodied in many other organizations widely different from those illustrated without departing from the spirit of the invention as defined in the appended claims.

What is claimed is:

1. In combination with a repeater, a duplex apparatus including side and phantom circuits to be balanced with respect to said repeater, a duplex balancing apparatus including side and phantom circuits, and impedance elements in said balancing apparatus certain of which are common to both the phantom and the side circuits, said impedance elements being so proportioned and related that said duplex balancing apparatus will simultaneously balance both side and phantom circuits of said first mentioned duplex apparatus.

2. In combination with a repeater, a duplex apparatus including side and phantom circuits to be balanced with respect to said repeater, a duplex balancing apparatus including side and phantom circuits, and a plurality of impedance elements in said balancing circuit including capacity elements common to the side and phantom circuits, said impedance elements being so proportioned and related that said duplex balancing apparatus will simultaneously balance both side and phantom circuits of said first mentioned duplex apparatus.

3. In combination with a repeater, a duplex apparatus including side and phantom circuits to be balanced with respect to said repeater, a duplex balancing apparatus including side and phantom circuits, and a plurality of impedance elements in said balancing circuit including inductance elements common to the side and phantom circuits, said impedance elements being so proportioned and related that said duplex balancing apparatus will simultaneously balance both side and phantom circuits of said first mentioned duplex apparatus.

4. In combination with a repeater, a duplex apparatus including side and phantom circuits to be balanced with respect to said repeater, a duplex balancing apparatus including side and phantom circuits, and a plurality of impedance elements in said balancing circuit including resistance elements common to the side and phantom circuits, said impedance elements being so proportioned and related that said duplex balancing apparatus will simultaneously balance both side and phantom circuits of said first mentioned duplex apparatus.

5. A duplex apparatus for balancing both side and phantom circuits of an apparatus to be balanced, said balancing apparatus including side and phantom circuits, and impendance elements in said balancing apparatus certain of which are common to both side and phantom circuits, said impedance elements being so proportioned and related that said duplex balancing apparatus will simultaneously balance both side and phantom circuits.

6. A duplex apparatus for balancing both side and phantom circuits of an apparatus to be balanced, said balancing apparatus including side and phantom circuits, and impedance elements in said balancing apparatus including capacity elements common to both side and phantom circuits, said impedance elements being so proportioned and related that said duplex balancing apparatus will simultaneously balance both side and phantom circuits.

7. A duplex apparatus for balancing both side and phantom circuits of an apparatus to be balanced, said balancing apparatus including side and phantom circuits, and impedance elements in said balancing apparatus including inductance elements common to both side and phantom circuits, and said impedence elements being so proportioned and related that said duplex balancing apparatus will simultaneously balance both side and phantom circuits.

8. A duplex apparatus for balancing both side and phantom circuits of an apparatus to be balanced, said balancing apparatus including side and phantom circuits, and impedance elements in said balancing apparatus including resistance elements common to both side and phantom circuits, said impedance elements being so proportioned and related that said duplex balancing apparatus will simultaneously balance both side and phantom circuits.

9. A duplex apparatus for balancing both side and phantom circuits of an apparatus to be balanced, said balancing apparatus including a side circuit and a phantom circuit, and impedance elements in said balancing apparatus certain of which are effective in one of said circuits only, said impedance elements being so proportioned and related that said duplex balancing apparatus will simultaneously balance both side and phantom circuits.

10. A duplex apparatus for balancing both side and phantom circuits of an apparatus to be balanced, said balancing apparatus including a side circuit and a phantom circuit, and impedance elements in said balancing apparatus certain of which are effective in said side circuit only, said impedance elements being so proportioned and related that said duplex balancing apparatus will simultaneously balance both side and phantom circuits.

11. A duplex apparatus for balancing both side and phantom circuits of an apparatus to be balanced, said balancing apparatus including a side circuit and a phantom circuit, and impedance elements in said balancing apparatus certain of which are effective in said phantom circuit only, said impedance elements being so proportioned and related that said duplex balancing apparatus will simultaneously balance both side and phantom circuits.

12. A duplex apparatus for balancing both side and phantom circuits of an apparatus to be balanced, said balancing apparatus including a side circuit and a phantom circuit, and impedance elements in said balancing apparatus including capacity elements certain of which are effective in one of said circuits only, said impedance elements being so proportioned and related that said duplex balancing apparatus will simultaneously balance both side and phantom circuits.

13. A duplex apparatus for balancing both side and phantom circuits of an apparatus to be balanced, said balancing apparatus including a side circuit and a phantom circuit, and impedance elements in said balancing apparatus including inductance elements certain of which are effective in one of said circuits only, said impedance elements being so proportioned and related that said duplex balancing apparatus will simultaneously balance both side and phantom circuits.

14. A duplex apparatus for balancing both side and phantom circuits of an apparatus to be balanced, said balancing apparatus including a side circuit and a phantom circuit, and impedance elements in said balancing apparatus including resistance elements certain of which are effective in one of said circuits only, said impedance elements being so proportioned and related that said duplex balancing apparatus will simultaneously balance both side and phantom circuits.

15. A duplex apparatus for balancing both side and phantom circuits of an apparatus to be balanced, said balancing apparatus including a side circuit and a phantom circuit, and impedance elements in said balancing apparatus including capacity elements certain of which are effective in the side circuit only, said impedance elements being so proportioned and related that said duplex balancing apparatus will simultaneously balance both side and phantom circuits.

16. A duplex apparatus for balancing both side and phantom circuits of an apparatus to be balanced, said balancing apparatus including a side circuit and a phantom circuit, and impedance elements in said balancing apparatus including capacity elements certain of which are effective in the phantom circuit only, said impedance elements being so proportioned and related that said duplex balancing apparatus will simultaneously balance both side and phantom circuits.

17. A duplex apparatus for balancing both side and phantom circuits of an apparatus to be balanced, said balancing apparatus including a side circuit and a phantom circuit, and impedance elements in said balancing apparatus including inductance elements certain of which are effective in the side circuit only, said impedance elements being so proportioned and related that said duplex balancing apparatus will simultaneously balance both side and phantom circuits.

18. A duplex apparatus for balancing both side and phantom circuits of an apparatus to be balanced, said balancing apparatus including a side circuit and a phantom circuit, and impedance elements in said balancing apparatus including inductance elements certain of which are effective in the phantom circuit only, said impedance elements being so proportioned and related that said duplex balancing apparatus will simultaneously balance both side and phantom circuits.

19. A duplex apparatus for balancing both side and phantom circuits of an apparatus to be balanced, said balancing apparatus including a side circuit and a phantom circuit, and impedance elements in said balancing apparatus including resistance elements certain of which are effective in the phantom circuit only, said impedance elements being so proportioned and related that said duplex balancing apparatus will simultaneously balance both side and phantom circuits.

20. A duplex balancing artificial line for simulating both side and phantom circuits of a duplex transmission line, said artificial line comprising side and phantom circuits, and a plurality of impedance elements in said artificial line including resistance elements effective in both side and phantom circuits, and resistance elements and capacity elements effective in one of said circuits only, said impedance elements being so proportioned and related that said duplex artificial line will simultaneously balance both side and phantom circuits of the duplex transmission line.

21. A duplex balancing artificial line for simulating both side and phantom circuits of a duplex transmission line, said artificial line comprising side and phantom circuits, and a plurality of impedance elements in said artificial line including resistance elements effective in both side and phantom circuits, and resistance elements effective in one of said circuits only, said impedance elements being so proportioned and related that said duplex artificial line will simultaneously balance both side and phantom circuits of the duplex transmission line.

22. A duplex balancing artificial line for simulating both side and phantom circuits of a duplex transmission line, said artificial line comprising side and phantom circuits, and a plurality of impedance elements in said artificial line including resistance elements effective in both side and phantom circuits and capacity elements effective in one of said circuits only, said impedance elements being so proportioned and related that said duplex artificial line will simultaneously balance both side and phantom circuits of the duplex transmission line.

23. A duplex balancing artificial line for simulating both side and phantom circuits of a duplex transmission line, said artificial line comprising side and phantom circuits, and a plurality of impedance elements in said artificial line including resistance elements effective in both side and phantom circuits, and resistance elements effective in the phantom circuit only, said impedance elements being so proportioned and related that said duplex artificial line will simultaneously balance both side and phantom circuits of the duplex transmission line.

24. A duplex balancing artificial line for simulating both side and phantom circuits of a duplex transmission line, said artificial line comprising side and phantom circuits, and a plurality of impedance elements in said artificial line including resistance elements effective in both side and phantom circuits and capacity elements effective in the side circuit only, said impedance elements being so proportioned and related that said duplex artificial line will simultaneously balance both side and phantom circuits of the duplex transmission line.

25. A duplex balancing artificial line for simulating both side and phantom circuits of a duplex transmission line, said artificial line comprising side and phantom circuits, and a plurality of impedance elements in said artificial line, including resistance elements effective in both side and phantom circuits, resistance elements effective in the phantom circuit only and capacity elements effective in the side circuit only, said impedance elements being so proportioned and related that said duplex artificial line will simultaneously balance both side and phantom circuits of the duplex transmission line.

In testimony whereof, I have signed my name to this specification this twenty-first day of May, 1918.

THOMAS SHAW.